United States Patent [19]
Ikari

[11] 4,429,978
[45] Feb. 7, 1984

[54] ALBADA FINDER

[75] Inventor: Kazuo Ikari, Hachiouji, Japan

[73] Assignee: Olympus Optical Co., Ltd., Tokyo, Japan

[21] Appl. No.: 366,088

[22] Filed: Apr. 6, 1982

[30] Foreign Application Priority Data

Apr. 9, 1981 [JP] Japan .................................. 56-53602

[51] Int. Cl.³ .............................................. G03B 13/08
[52] U.S. Cl. ....................................... 354/224; 350/410
[58] Field of Search ...................... 354/219, 224, 225; 350/410, 412, 442, 445, 453, 469, 458, 462

[56] References Cited

U.S. PATENT DOCUMENTS

| | | | |
|---|---|---|---|
| 3,517,582 | 6/1970 | Pituley | 354/219 |
| 3,575,082 | 4/1971 | McClune | 354/225 |
| 4,348,090 | 9/1982 | Iizuka | 354/224 |

FOREIGN PATENT DOCUMENTS 915118 1/1963 United Kingdom ................ 354/219

*Primary Examiner*—John Gonzales
*Attorney, Agent, or Firm*—Cushman, Darby & Cushman

[57] ABSTRACT

A four-lens-element albada finder comprising a field mask lens having a field mask and an eyepiece of a positive lens to improve the sight of the visual field and field mask images.

25 Claims, 21 Drawing Figures

ALBADA FINDER

BACKGROUND OF THE INVENTION (a) Field of the Invention

This invention relates to an albada finder improved so that images within the visual field can be well seen.

(b) Description of the Prior Art

In the conventional albada finder, mostly the astigmatism is generated to be so large that the sight of the visual field is bad and particularly the sight of the periphery of the visual field has been bad. Further, in incorporating a range finder or the like into the albada finder, it is desirable to place a half mirror between the reflecting surface and the surface on which the field mask is provided of the objective. However, in the albada finder in which the half mirror is thus placed between the reflecting surface and the surface on which the field mask is provided, the field mask image is likely to become dark. In order to improve it to make the field mask image bright, it is considered to make the surface on which the field mask is provided spherical as shown in FIG. 1 so that the light will be easy to collect. However, in case the surface on which the field mask is provided is thus made spherical, the astigmatism will be more generated.

SUMMARY OF THE INVENTION

Therefore, a primary object of the present invention is to provide an albada finder wherein the astigmatism is improved so that the images within the visual field will be easy to see.

According to the present invention, this object is attained by forming an objective of a first lens element having a field mask and a second positive lens element.

According to a preferred formation of the present invention, the field mask is provided on the surface on the side facing the objective of the first lens element.

According to another preferred formation, the field mask can be provided on the surface on the side facing the second lens element of the first lens element.

That is to say, the formation of the albada finder according to the present invention is as shown in FIG. 2 and comprises objectives $O_1$ and $O_2$, a field mask lens $E_1$ and an eyepiece $E_2$, a reflecting mirror or translucent mirror M is provided on a part of the surface on the eyepiece $E_2$ side of the objective $O_2$ and a field mask I is provided on the surface on the objective $O_2$ side of the field mask lens $E_1$. As illustrated by the dotted lines, this field mask I may be provided on the surface on the eyepiece $E_2$ side of the field mask lens $E_1$. In the albada finder according to the present invention, the eyepiece E of the conventional example shown in FIG. 1 is divided into the field mask lens $E_1$ and eyepiece $E_2$ and the shapes of these lenses are made so proper as to be able to form a finder which is bright and is good in the sight of the visual field image and field mask image.

Further, according to the present invention, the radii of curvatures $r_7$ and $r_8$ of the respective surfaces of the eyepiece $E_2$ are set to satisfy the conditions shown in the following so that an albada finder better in the aberration will be obtained:

$$0.5 < |r_7/r_8| < 10, \ r_7 > 0 \text{ and } r_8 < 0.$$

In the avove mentioned conditions, if the upper limit is exceeded, the astigmatism of the visual field system will be large to be negative and will not be desireable.

DESCRIPTION OF THE PREFERRED EMBODIMENTS

Figure 1:
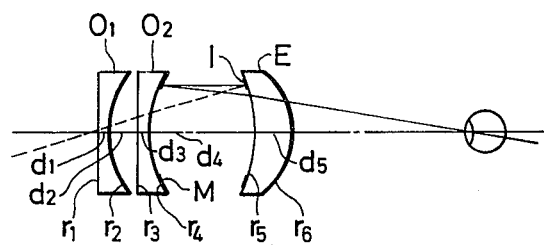
FIG. 1 is a sectional view of a conventional albada finder.

Now, numerical data will be described below as preferred embodiments of the albada finder according to the present invention.

Embodiment 1

$r_1 = \infty$
$r_2 = 13.758$
$r_3 = \infty$
$r_4 = 78.542$
$r_5 = -150.595$
$r_6 = \infty$
$r_7 = 100.0$
$r_8 = -24.355$
$D = -1.0, \text{E.P.} = 15$ $d_1 = 1.0$, $n_1 = 1.491$
$d_2 = 2.6$
$d_3 = 1.0$, $n_2 = 1.51633$
$d_4 = 14.74$
$d_5 = 1.0$, $n_3 = 1.48749$
$d_6 = 0.2$
$d_7 = 3.54$, $n_4 = 1.491$ Embodiment 2

$r_1 = \infty$
$r_2 = 14.068$
$r_3 = \infty$
$r_4 = 73.501$
$r_5 = -150.0$
$r_6 = \infty$
$r_7 = 50.0$
$r_8 = -31.442$
$D = -1.0, \text{E.P.} = 15$ $d_1 = 1.0$, $n_1 = 1.491$
$d_2 = 2.6$
$d_3 = 1.0$, $n_2 = 1.51633$
$d_4 = 14.74$
$d_5 = 1.0$, $n_3 = 1.491$
$d_6 = 0.2$
$d_7 = 3.54$, $n_4 = 1.491$ Embodiment 3

$r_1 = 100.0$
$r_2 = 12.579$
$r_3 = \infty$
$r_4 = 78.542$
$r_5 = -150.595$
$r_6 = \infty$
$r_7 = 90.0$
$r_8 = -25.598$ $d_1 = 1.0$, $n_1 = 1.491$
$d_2 = 2.6$
$d_3 = 1.0$, $n_2 = 1.51633$
$d_4 = 14.74$
$d_5 = 1.0$, $n_3 = 1.48749$
$d_6 = 0.2$
$d_7 = 3.54$, $n_4 = 1.491$ -continued

D = −1.0, E.P. = 15

In addition to the above respective embodiments, when the above described conditions are satisfied and such aspherical surface as is represented by the following formula is introduced, the astigmatism will be able to be improved:

$$\frac{cy^2}{1 + \sqrt{1 - k^2 c^2 y^2}} + ey^4 + fy^6 + gy^8 + hy^{10}$$

wherein the reference symbol x represents a displacement in the optical axis direction from the apex of the aspherical surface, y represents a displacement in the direction vertical to the optical axis, c represents a curvature ($=1/r_i$) near the optical axis, k represents a conic coefficient and e, f, g and h represent aspherical coefficients.

Embodiments using such aspherical surfaces shall be shown in the following:

Embodiment 4
$r_1 = 105.612$ (Aspherical)
$d_1 = 1.0$, $n_1 = 1.491$
$r_2 = 12.182$
$d_2 = 2.6$
$r_3 = \infty$
$d_3 = 1.0$, $n_2 = 1.51633$
$r_4 = 79.083$
$d_4 = 14.74$
$r_5 = -150.0$
$d_5 = 1.0$, $n_3 = 1.48749$
$r_6 = \infty$
$d_6 = 0.2$
$r_7 = 100.0$
$d_7 = 3.54$, $n_4 = 1.491$
$r_8 = -23.847$
$k = 1.0$, $e = 0.569 \times 10^{-4}$, $f = -0.863 \times 10^{-6}$,
$g = 0.540 \times 10^{-8}$, $h = -0.123 \times 10^{-10}$
$D = -0.5$, E.P. = 12.1

Embodiment 5
$r_1 = 111.796$ (Aspherical)
$d_1 = 1.0$, $n_1 = 1.491$
$r_2 = 12.108$
$d_2 = 2.8$
$r_3 = \infty$
$d_3 = 1.0$, $n_2 = 1.51633$
$r_4 = 80.602$
$d_4 = 14.74$
$r_5 = -150.0$
$d_5 = 0.8$, $n_3 = 1.491$
$r_6 = \infty$
$d_6 = 0.5$
$r_7 = 100.0$
$d_7 = 3.44$, $n_4 = 1.491$
$r_8 = -24.463$
$k = 1.0$, $e = 0.426 \times 10^{-4}$, $f = -0.398 \times 10^{-6}$
$g = 0.399 \times 10^{-9}$, $h = 0.601 \times 10^{-11}$
$D = -1.0$, E.P. = 12.3

Embodiment 6
$r_1 = 79.371$ (Aspherical)
$d_1 = 1.0$, $n_1 = 1.491$
$r_2 = 12.108$
$d_2 = 2.8$
$r_3 = \infty$
$d_3 = 1.0$, $n_2 = 1.51633$
$r_4 = 73.292$
$d_4 = 14.74$
$r_5 = -100.0$
$d_5 = 1.0$, $n_3 = 1.491$
$r_6 = 500.0$
$d_6 = 0.4$
$r_7 = 100.0$
$d_7 = 3.3$, $n_4 = 1.491$ $r_8 = -22.243$
$k = 1.0$, $e = 0.391 \times 10^{-5}$, $f = -0.516 \times 10^{-7}$
$g = 0.399 \times 10^{-9}$, $h = -0.179 \times 10^{-11}$
$D = -1.0$, E.P. = 12.5

Embodiment 7
$r_1 = 100.0$ (Aspherical)
$d_1 = 1.0$, $n_1 = 1.491$
$r_2 = 12.579$
$d_2 = 2.6$
$r_3 = \infty$
$d_3 = 1.0$, $n_2 = 1.51633$
$r_4 = 78.542$
$d_4 = 14.74$
$r_5 = -150.595$
$d_5 = 1.0$, $n_3 = 1.48749$
$r_6 = \infty$
$d_6 = 0.2$
$r_7 = 100.0$
$d_7 = 3.54$, $n_4 = 1.491$
$r_8 = -24.355$
$k = 5.0$, $e = 0$, $f = 0$, $g = 0$, $h = 0$
$D = -0.5$, E.P. = 15

Embodiment 8
$r_1 = 76.155$
$d_1 = 1.0$, $n_1 = 1.491$
$r_2 = 12.108$ (Aspherical)
$d_2 = 2.6$
$r_3 = \infty$
$d_3 = 1.0$, $n_2 = 1.51633$
$r_4 = 76.57$
$d_4 = 14.66$
$r_5 = -120.0$
$d_5 = 1.2$, $n_3 = 1.491$
$r_6 = 200.0$
$d_6 = 0.5$
$r_7 = 100.0$
$d_7 = 4.0$, $n_4 = 1.48749$
$r_8 = -22.132$
$k = 1.1$, $e = -0.471 \times 10^{-5}$, $f = 0.1 \times 10^{-6}$
$g = 0.167 \times 10^{-10}$, $h = 0$
$D = -1.2$, E.P. = 13

Embodiment 9
$r_1 = \infty$
$d_1 = 1.0$, $n_1 = 1.491$
$r_2 = 14.38$ (Aspherical)
$d_2 = 2.6$
$r_3 = \infty$
$d_3 = 1.0$, $n_2 = 1.51633$
$r_4 = 78.687$
$d_4 = 14.74$
$r_5 = -150.0$
$d_5 = 1.0$, $n_3 = 1.48749$
$r_6 = \infty$
$d_6 = 0.2$
$r_7 = 50.0$
$d_7 = 3.54$, $n_4 = 1.491$
$r_8 = -32.295$
$k = 0.9$, $e = 0$, $f = 0$, $g = 0$, $h = 0$
$D = -1.0$, E.P. = 13.4

Embodiment 10
$r_1 = 300.0$
$d_1 = 1.0$, $n_1 = 1.491$
$r_2 = 14.97$ (Aspherical)
$d_2 = 2.5$
$r_3 = \infty$
$d_3 = 1.0$, $n_2 = 1.51633$
$r_4 = 73.513$
$d_4 = 14.66$
$r_5 = -150.0$
$d_5 = 1.2$, $n_3 = 1.491$
$r_6 = 200.0$
$d_6 = 0.5$
$r_7 = 70.0$
$d_7 = 3.5$, $n_4 = 1.491$
$r_8 = -25.753$
$k = 1.0$, $e = 0.614 \times 10^{-5}$, $f = 0.116 \times 10^{-6}$
$g = 0.212 \times 10^{-10}$, $h = 0.274 \times 10^{-14}$
$D = -1.0$, E.P. = 12.3

Embodiment 11
$r_1 = \infty$
$d_1 = 1.2$, $n_1 = 1.491$

-continued $r_2 = 15.2$
$\quad d_2 = 3.0$
$r_3 = 100.0$
$\quad d_3 = 1.0 \quad n_2 = 1.51633$
$r_4 = 75.8$
$\quad d_4 = 15.17$
$r_5 = -100.0$
$\quad d_5 = 1.0 \quad n_3 = 1.51633$
$r_6 = \infty$
$\quad d_6 = 0.2$
$r_7 = 100.0$ (Aspherical)
$\quad d_7 = 4.0 \quad n_4 = 1.491$
$r_8 = -26.474$
$k = 0.7, e = -0.5 \times 10^{-5}, f = 0, g = 0, h = 0$
$D = -1.0, E.P. = 15.0$ Embodiment 12

$r_1 = 510.0$
$\quad d_1 = 1.0 \quad n_1 = 1.491$
$r_2 = 15.2$
$\quad d_2 = 3.0$
$r_3 = 100.0$
$\quad d_3 = 1.0 \quad n_2 = 1.51633$
$r_4 = 75.8$
$\quad d_4 = 15.17$
$r_5 = -100.0$
$\quad d_5 = 1.0 \quad n_3 = 1.51633$
$r_6 = \infty$
$\quad d_6 = 0.2$
$r_7 = 80.0$ (Aspherical)
$\quad d_7 = 3.5 \quad n_4 = 1.491$
$r_8 = -28.487$
$k = 1.0, e = -0.353 \times 10^{-5}, f = -0.2 \times 10^{-6}$
$g = 0, h = 0$
$D = -1.0, E.P. = 10$ Embodiment 13

$r_1 = 109.951$
$\quad d_1 = 1.0 \quad n_1 = 1.491$
$r_2 = 12.899$
$\quad d_2 = 2.6$
$r_3 = 500.0$
$\quad d_3 = 1.0 \quad n_2 = 1.51633$
$r_4 = 77.0$
$\quad d_4 = 15.16$
$r_5 = -200.0$
$\quad d_5 = 1.0 \quad n_3 = 1.491$
$r_6 = \infty$
$\quad d_6 = 0.5$
$r_7 = 100.0$
$\quad d_7 = 4.0 \quad n_4 = 1.491$
$r_8 = -27.205$ (Aspherical)
$k = 0.7, e = -0.344 \times 10^{-5}, f = 0, g = 0, h = 0$
$D = -1.0, E.P. = 11$ Embodiment 14

$r_1 = \infty$
$\quad d_1 = 1.0 \quad n_1 = 1.491$
$r_2 = 15.6$
$\quad d_2 = 2.6$
$r_3 = \infty$
$\quad d_3 = 1.0 \quad n_2 = 1.51633$
$r_4 = 78.542$
$\quad d_4 = 14.74$
$r_5 = -150.0$
$\quad d_5 = 1.0 \quad n_3 = 1.48749$
$r_6 = \infty$
$\quad d_6 = 0.2$
$r_7 = 50$
$\quad d_7 = 3.54 \quad n_4 = 1.491$
$r_8 = -34.123$ (Aspherical)
$k = 1.2, e = 0.154 \times 10^{-5}, f = 0, g = 0, h = 0$
$D = -1.0, E.P. = 15$ In the above embodiments, the reference symbols $r_1$ through $r_8$ represent radii of curvatures of the respective surfaces of the lenses, $d_1$ through $d_7$ represent thicknesses and air spaces between the respective lenses, $n_1$ through $n_4$ represent refractive indices of the respective lenses, D represents a diopter of the finder and E.P. represents a distance from the last surface of the lens to the eye. By the way, the values of r and d are in mm.

Figure 5:
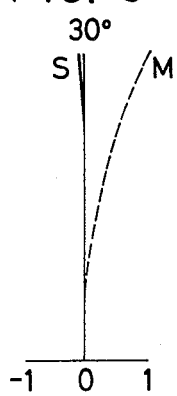
FIGS. 5 and 6 are curve diagrams of astigmatisms of Embodiment 1 of the present invention.
Figure 6:
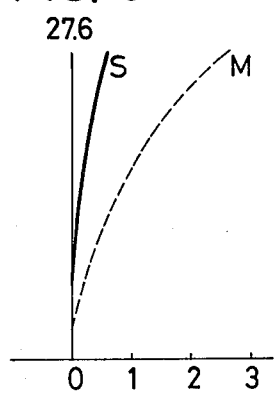
Figure 7:
FIGS. 7 to 19 are curve diagrams of astigmatisms respectively of Embodiments 2 to 14 of the present invention.
Figure 8:
Figure 9:
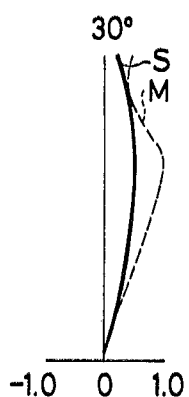
Figure 10:
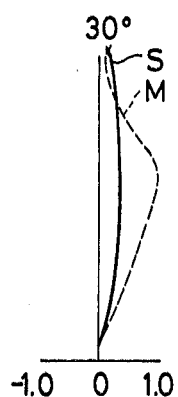
Figure 11:
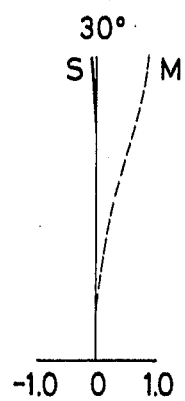
Figure 12:
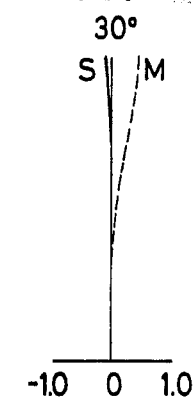
Figure 13:
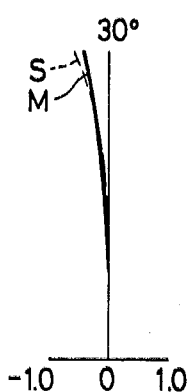
Figure 14:
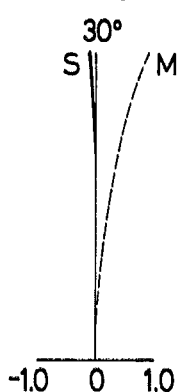
Figure 15:
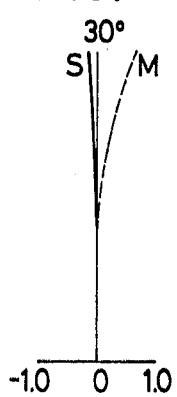
Figure 16:
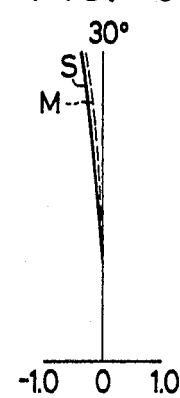
Figure 17:
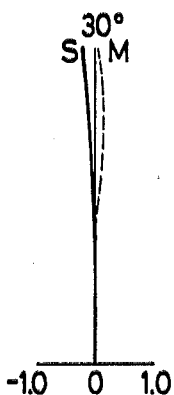
Figure 18:
Figure 19:
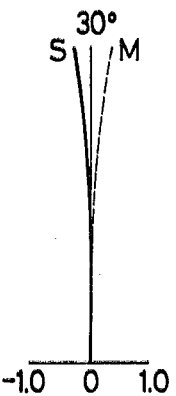

Among these embodiments, the astigmatism of Embodiment 1 is as shown in FIG. 5 and the astigmatism of the field mask image (which is of a height about 90% of the height of the visual field image) of Embodiment 1 is as shown in FIG. 6. By the way, these aberration curves were obtained by making the light come in from the eye side and reversely tracing it. The aberration amount is shown in diopters.

An example of numerical data of the conventional albada finder of the lens formation shown in FIG. 1 is shown in the following.

Figure 3:
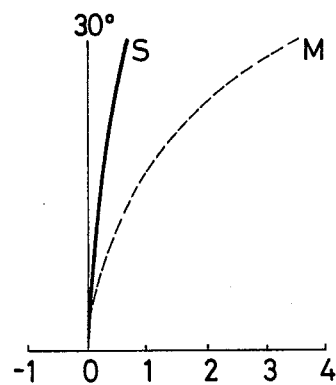
FIGS. 3 and 4 are curve diagrams of astigmatisms of the conventional example shown in FIG. 1.
Figure 4:
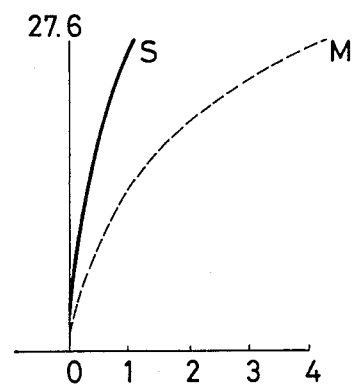

$r_1 = \infty$
$\quad d_1 = 1.0 \quad n_1 = 1.491$
$r_2 = 14.068$
$\quad d_2 = 2.6$
$r_3 = \infty$
$\quad d_3 = 1.0 \quad n_2 = 1.51633$
$r_4 = 73.501$
$\quad d_4 = 14.74$
$r_5 = -150.0$
$\quad d_5 = 4.74 \quad n_3 = 1.491$
$r_6 = -20.022$
$D = -1.0, E.P. = 15$ The astigmatism of this conventional example is as shown in FIG. 3 and the astigmatism of its field mask image is as shown in FIG. 4.

As evident from the comparison of the above mentioned conventional example with the embodiments of the present invention, in the albada finder of the present invention, the astigmatism of the visual field system and the astigmatism of the field mask system are simultaneously improved.

As described above, in Embodiments 4 to 14 among the respective embodiments of the present invention, aspherical surfaces are introduced into the lens systems. In Embodiments 4 to 7 among them, the surface on the object side of the objective $O_1$ is made aspherical. In case the first surface is thus made aspherical, it will be desirable to make $0.5 > k$. If k is not $0.5 < k$, the negative astigmatism will increase and will not be desirable.

Further, in Embodiments 8 to 10, the surface on the eyepiece side of the objective $O_1$ is made aspherical. In the case of this example, it will be desirable that k is $0.8 < k < 1.5$. If the lower limit of this condition is exceeded, the positive astigmatism will increase and, if the upper limit is exceeded, the negative astigmatism will increase and the negative distortion will increase and will not be desirable.

Further, in Embodiments 11 and 12, the surface on the objective side of the eyepiece $E_2$ is made aspherical. In this case, it will be desirable that k is $0.4 < k < 2.0$. If the lower limit of this condition is exceeded, the astigmatism will be large to be negative. If the upper limit is exceeded, the astigmatism will be large to be positive and will not be desirable.

Further, in Embodiments 13 and 14, the surface on the eye side of the eyepiece $E_2$ is aspherical. In this case, it will be desirable that k is $0.3 < k < 2.0$. If the lower limit of this condition is exceeded, the negative astigmatism will become large. If the upper limit is exceeded, the positive astigmatism will become large and will not be desirable.

Figure 2:
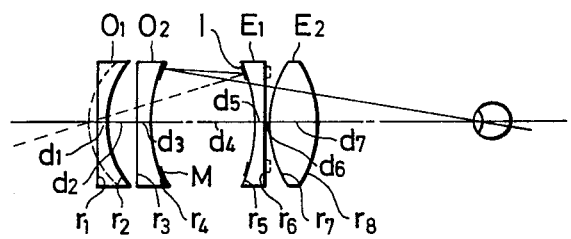
FIG. 2 is a sectional view of an albada finder according to the present invention.
Figure 20:
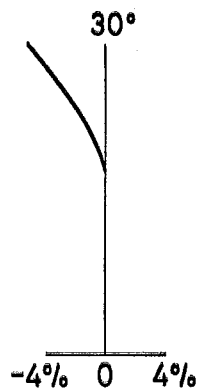
FIGS. 20 and 21 are curve diagrams of deformations of Embodiment 4 of the present invention.
Figure 21:
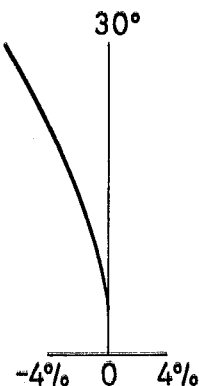

In order to make the distortion favorable, it is advantageous to use a negative meniscus lens having the convex surface on the object side for the objective as shown by the dotted line in FIG. 2. Further, when an aspherical surface is introduced, the distortion will be able to be improved. In case the distortion is improved by thus introducing the aspherical surface, it will be more effective to use an aspherical surface for the objective $O_1$. This shall be clarified by exemplifying Embodiment 4 in which an aspherical surface is used for the first surface. That is to say, it will be clear from the comparison of the distortion of Embodiment 4 (wherein the aspherical surface is used) shown in FIG. 20 with the distortion of the system in which a spherical surface of a radius of curvature (of $r_1 = 105.612$) equal to the radius of curvature near the optical axis is made without using an aspherical surface for the first surface in Embodiment 4 shown in FIG. 21. However, if the negative distortion is made less in the respective image heights, the positive astigmatism will increase. Therefore, this embodiment is so made that, at a low image height, the astigmatism will be produced to some extent but there will be substantially no distortion and, as of a total image height, both astigmatism and distortion will become small. Particularly, in the case of a view finder, as different from a photographic lens, it is important to determine the view and therefore it is preferable that the distortion in the visual field center is small. Therefore, as explained in Embodiment 4, it is desirable to utilize the aspherical surface so that particularly there will be no distortion at a low image height.

In the conventional albada finder, in order to keep the performance of the field mask image, the eyepiece has had to be worked and assembled very precisely. But, according to the present invention, the eyepiece may be less precise than the conventional one, because, as the eyepiece of the present invention is separated into a field mask lens and eyepiece, if the field mask is precise, even if the eyepiece is less precise to some extent, the performance of the field mask will be kept.

Further, as in Embodiment 2 and others, if the distance $(d_5+d_6+d_7)$ from the surface on the objective side of the field mask lens $E_1$ to the surface on the eye side of the eyepiece $E_2$ is made equal to the thickness $(d_5)$ of the eyepiece E and the radii of curvatures of the respective surfaces are so determined as not to vary the diopter of the entire system in the design, an albada finder good in the sight of the visual field image will be able to be formed by only replacing the eyepiece in the existing finder.

As explained in the above, according to the present invention, an albada finder good in the sight of the visual field and field mask is obtained. Particularly, in order to improve that, in case a range finder is built in the albada finder, the field mask will be likely to become dark, it is necessary to curve the field mask surface so that the field mask light will be easy to collect. In such case, an astigmatism will be likely to be generated. However, if the formation of the present invention is applied, the astigmatism will be able to be controlled. Therefore, it is very effective to apply the idea of the present invention to an albada finder in which the field mask surface is curved.

I claim:

1. An albada finder comprising a first negative lens element, a second negative lens element having a part thereof any one of a reflecting surface and semi-transmission surface both used to form an image of a field mask, a third lens element and a positive eyepiece element, said first and second negative lens elements forming an objective, and said field mask being provided on the surface of said third lens element which is faced to any one of said second negative lens element and said positive eyepiece element, and satisfying the following conditions:

$0.5 < |r_7/r_8| < 10$ $r_7 > 0$ $r_8 < 0$ wherein the reference symbols $r_7$ and $r_8$ represent radii of curvature of the respective surfaces of the positive eyepiece element.

2. An albada finder according to claim 1 wherein said first negative lens element is a negative meniscus lens having the convex surface on the object side.

3. An albada finder according to claim 1 having the following numerical data:

| | | |
|---|---|---|
| $r_1 = \infty$ | | |
| | $d_1 = 1.0$ | $n_1 = 1.491$ |
| $r_2 = 13.758$ | | |
| | $d_2 = 2.6$ | |
| $r_3 = \infty$ | | |
| | $d_3 = 1.0$ | $n_2 = 1.51633$ |
| $r_4 = 78.542$ | | |
| | $d_4 = 14.74$ | |
| $r_5 = -150.595$ | | |
| | $d_5 = 1.0$ | $n_3 = 1.48749$ |
| $r_6 = \infty$ | | |
| | $d_6 = 0.2$ | |
| $r_7 = 100.0$ | | |
| | $d_7 = 3.54$ | $n_4 = 1.491$ |
| $r_8 = -24.355$ | | |
| $D = -1.0$, E.P. $= 15$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens element, the symbol D represents diopter and the symbol E.P. represents the distance between the surface of the eyepiece element on the eye side and the eye.

4. An albada finder according to claim 1 having the following numerical data:

| | | |
|---|---|---|
| $r_1 = \infty$ | | |
| | $d_1 = 1.0$ | $n_1 = 1.491$ |
| $r_2 = 14.068$ | | |
| | $d_2 = 2.6$ | |
| $r_3 = \infty$ | | |
| | $d_3 = 1.0$ | $n_2 = 1.51633$ |
| $r_4 = 73.501$ | | |
| | $d_4 = 14.74$ | |
| $r_5 = -150.0$ | | |
| | $d_5 = 1.0$ | $n_3 = 1.491$ |
| $r_6 = \infty$ | | |
| | $d_6 = 0.2$ | |
| $r_7 = 50.0$ | | |
| | $d_7 = 3.54$ | $n_4 = 1.491$ |
| $r_8 = -31.442$ | | |
| $D = -1.0$, E.P. $= 15$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens element, the symbol D represents diopter and the symbol E.P. represents the distance between the surface of the eyepiece element on the eye side and the eye.

5. An albada finder according to claim 2 having the following numerical data:

| | | |
|---|---|---|
| $r_1 = 100.0$ | | |
| | $d_1 = 1.0$ | $n_1 = 1.491$ |
| $r_2 = 12.579$ | | |
| | $d_2 = 2.6$ | |
| $r_3 = \infty$ | | |
| | $d_3 = 1.0$ | $n_2 = 1.51633$ |
| $r_4 = 78.542$ | | |
| | $d_4 = 14.74$ | |
| $r_5 = -150.595$ | | |
| | $d_5 = 1.0$ | $n_3 = 1.48749$ |
| $r_6 = \infty$ | | |
| | $d_6 = 0.2$ | |
| $r_7 = 90.0$ | | |
| | $d_7 = 3.54$ | $n_4 = 1.491$ |
| $r_8 = -25.598$ | | |
| $D = -1.0$, E.P. = 15 | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens element, the symbol D represents diopter and the symbol E.P. represents the distance between the surface of the eyepiece element on the eye side and the eye.

6. An albada finder according to claim 1 wherein at least one of the surfaces of the respective lens elements is an aspherical surface satisfying the following formula:

$$x = \frac{cy^2}{1 + \sqrt{1 - k^2c^2y^2}} + ey^4 + fy^6 + gy^8 + hy^{10}$$

wherein the reference symbol x represents displacement in the optical axis direction from the apex of the aspherical surface, the symbol y represents displacement in the direction vertical to the optical axis, the symbol c represents curvature near the optical axis, the symbol k represents conic coefficient and the symbols e, f, g and h respectively represent aspherical coefficients.

7. An albada finder according to claim 6 wherein the surface of said first lens element on the object side is the aspherical surface.

8. An albada finder according to claim 7 satisfying the following condition:

$0.5 < k$.

9. An albada finder according to claim 8 having the following numerical data:

| | | |
|---|---|---|
| $r_1 = 105.612$ (Aspherical) | | |
| | $d_1 = 1.0$ | $n_1 = 1.491$ |
| $r_2 = 12.182$ | | |
| | $d_2 = 2.6$ | |
| $r_3 = \infty$ | | |
| | $d_3 = 1.0$ | $n_2 = 1.51633$ |
| $r_4 = 79.083$ | | |
| | $d_4 = 14.74$ | |
| $r_5 = -150.0$ | | |
| | $d_5 = 1.0$ | $n_3 = 1.48749$ |
| $r_6 = \infty$ | | |
| | $d_6 = 0.2$ | |
| $r_7 = 100.0$ | | |
| | $d_7 = 3.54$ | $n_4 = 1.491$ |

-continued $r_8 = -23.847$
$k = 1.0$, $e = 0.569 \times 10^{-4}$, $f = -0.863 \times 10^{-6}$,
$g = 0.540 \times 10^{-8}$, $h = -0.123 \times 10^{-10}$
$D = -0.5$, E.P. = 12.1 wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

10. An albada finder according to claim 8 having the following numerical data:

| | | |
|---|---|---|
| $r_1 = 111.796$ (Aspherical) | | |
| | $d_1 = 1.0$ | $n_1 = 1.491$ |
| $r_2 = 12.108$ | | |
| | $d_2 = 2.8$ | |
| $r_3 = \infty$ | | |
| | $d_3 = 1.0$ | $n_2 = 1.51633$ |
| $r_4 = 80.602$ | | |
| | $d_4 = 14.74$ | |
| $r_5 = -150.0$ | | |
| | $d_5 = 0.8$ | $n_3 = 1.491$ |
| $r_6 = \infty$ | | |
| | $d_6 = 0.5$ | |
| $r_7 = 100.0$ | | |
| | $d_7 = 3.44$ | $n_4 = 1.491$ |
| $r_8 = -24.463$ | | |
| $k = 1.0$, $e = 0.426 \times 10^{-4}$, $f = -0.398 \times 10^{-6}$ | | |
| $g = 0.399 \times 10^{-9}$, $h = 0.601 \times 10^{-11}$ | | |
| $D = -1.0$, E.P. = 12.3 | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

11. An albada finder according to claim 8 having the following numerical data:

| | | |
|---|---|---|
| $r_1 = 79.371$ (Aspherical) | | |
| | $d_1 = 1.0$ | $n_1 = 1.491$ |
| $r_2 = 12.108$ | | |
| | $d_2 = 2.8$ | |
| $r_3 = \infty$ | | |
| | $d_3 = 1.0$ | $n_2 = 1.51633$ |
| $r_4 = 73.292$ | | |
| | $d_4 = 14.74$ | |
| $r_5 = -100.0$ | | |
| | $d_5 = 1.0$ | $n_3 = 1.491$ |
| $d_6 = 500.0$ | | |
| | $d_6 = 0.4$ | |
| $r_7 = 100.0$ | | |
| | $d_7 = 3.3$ | $n_4 = 1.491$ |
| $r_8 = -22.243$ | | |
| $k = 1.0$, $e = 0.391 \times 10^{-5}$, $f = -0.516 \times 10^{-7}$ | | |
| $g = 0.399 \times 10^{-9}$, $h = -0.179 \times 10^{-11}$ | | |
| $D = -1.0$, E.P. = 12.5 | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

12. An albada finder according to claim 8 having the following numerical data:

| | | |
|---|---|---|
| $r_1 = 100.0$ (Aspherical) | | |
| | $d_1 = 1.0$ | $n_1 = 1.491$ |
| $r_2 = 12.579$ | | |
| | $d_2 = 2.6$ | |
| $r_3 = \infty$ | | |
| | $d_3 = 1.0$ | $n_2 = 1.51633$ |
| $r_4 = 78.542$ | | |
| | $d_4 = 14.74$ | |
| $r_5 = -150.595$ | | |
| | $d_5 = 1.0$ | $n_3 = 1.48749$ |
| $r_6 = \infty$ | | |
| | $d_6 = 0.2$ | |
| $r_7 = 100.0$ | | |
| | $d_7 = 3.54$ | $n_4 = 1.491$ |
| $r_8 = -24.355$ | | |
| $k = 5.0, e = 0, f = 0, g = 0, h = 0$ | | |
| $D = -0.5,$ E.P. $= 15$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

13. An albada finder according to claim 6 wherein the surface of said first lens element on the image side is the aspherical surface.

14. An albada finder according to claim 13 satisfying the following condition:

$$0.8 < k < 1.5.$$

15. An albada finder according to claim 14 having the following numerical data:

| | | |
|---|---|---|
| $r_1 = 76.155$ | | |
| | $d_1 = 1.0$ | $n_1 = 1.491$ |
| $r_2 = 12.108$ (Aspherical) | | |
| | $d_2 = 2.6$ | |
| $r_3 = \infty$ | | |
| | $d_3 = 1.0$ | $n_2 = 1.51633$ |
| $r_4 = 76.57$ | | |
| | $d_4 = 14.66$ | |
| $r_5 = -120.0$ | | |
| | $d_5 = 1.2$ | $n_3 = 1.491$ |
| $r_6 = 200.0$ | | |
| | $d_6 = 0.5$ | |
| $r_7 = 100.0$ | | |
| | $d_7 = 4.0$ | $n_4 = 1.48749$ |
| $r_8 = -22.132$ | | |
| $k = 1.1, e = -0.471 \times 10^{-5}, f = 0.1 \times 10^{-6}$ | | |
| $g = 0.167 \times 10^{-10}, h = 0$ | | |
| $D = -1.2,$ E.P. $= 13$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

16. An albada finder according to claim 14 having the following numerical data:

| | | |
|---|---|---|
| $r_1 = \infty$ | | |
| | $d_1 = 1.0$ | $n_1 = 1.491$ |
| $r_2 = 14.38$ (Aspherical) | | |
| | $d_2 = 2.6$ | |
| $r_3 = \infty$ | | |
| | $d_3 = 1.0$ | $n_2 = 1.51633$ |
| $r_4 = 78.687$ | | |
| | $d_4 = 14.74$ | |
| $r_5 = -150.0$ | | |
| | $d_5 = 1.0$ | $n_3 = 1.48749$ |
| $r_6 = \infty$ | | |
| | $d_6 = 0.2$ | |
| $r_7 = 50.0$ | | |
| | $d_7 = 3.54$ | $n_4 = 1.491$ |
| $r_8 = -32.295$ | | |
| $k = 0.9, e = 0, f = 0, g = 0, h = 0$ | | |
| $D = -1.0,$ E.P. $= 13.4$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

17. An albada finder according to claim 14 having the following numerical data:

| | | |
|---|---|---|
| $r_1 = 300.0$ | | |
| | $d_1 = 1.0$ | $n_1 = 1.491$ |
| $r_2 = 14.97$ (Aspherical) | | |
| | $d_2 = 2.5$ | |
| $r_3 = \infty$ | | |
| | $d_3 = 1.0$ | $n_2 = 1.51633$ |
| $r_4 = 73.513$ | | |
| | $d_4 = 14.66$ | |
| $r_5 = -150.0$ | | |
| | $d_5 = 1.2$ | $n_3 = 1.491$ |
| $r_6 = 200.0$ | | |
| | $d_6 = 0.5$ | |
| $r_7 = 70.0$ | | |
| | $d_7 = 3.5$ | $n_4 = 1.491$ |
| $r_8 = -25.753$ | | |
| $k = 1.0, e = 0.614 \times 10^{-5}, f = 0.116 \times 10^{-6}$ | | |
| $g = 0.212 \times 10^{-10}, h = 0.274 \times 10^{-14}$ | | |
| $D = -1.0,$ E.P. $= 12.3$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyeplace element on the eye side and the eye.

18. An albada finder according to claim 6 wherein the surface of said eyepiece element on the object side is the aspherical surface.

19. An albada finder according to claim 18 satisfying the following conditions:

$$0.4 < k < 2.0.$$

20. An albada finder according to claim 19 having the following numerical data:

| | | |
|---|---|---|
| $r_1 = \infty$ | | |
| | $d_1 = 1.2$ | $n_1 = 1.491$ |
| $r_2 = 15.2$ | | |
| | $d_2 = 3.0$ | |
| $r_3 = 100.0$ | | |
| | $d_3 = 1.0$ | $n_2 = 1.51633$ |
| $r_4 = 75.8$ | | |
| | $d_4 = 15.17$ | |
| $r_5 = -100.0$ | | |
| | $d_5 = 1.0$ | $n_3 = 1.51633$ |
| $r_6 = \infty$ | | |
| | $d_6 = 0.2$ | |
| $r_7 = 100.0$ (Aspherical) | | |
| | $d_7 = 4.0$ | $n_4 = 1.491$ |
| $r_8 = -26.474$ | | |
| $k = 0.7, e = -0.5 \times 10^{-5}, f = 0, g = 0, h = 0$ | | |
| $D = -1.0, E.P. = 15.0$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

21. An albada finder according to claim 19 having the following numerical data:

| | | |
|---|---|---|
| $r_1 = 510.0$ | | |
| | $d_1 = 1.0$ | $n_1 = 1.491$ |
| $r_2 = 15.2$ | | |
| | $d_2 = 3.0$ | |
| $r_3 = 100.0$ | | |
| | $d_3 = 1.0$ | $n_2 = 1.51633$ |
| $r_4 = 75.8$ | | |
| | $d_4 = 15.17$ | |
| $r_5 = -100.0$ | | |
| | $d_5 = 1.0$ | $n_3 = 1.51633$ |
| $r_6 = \infty$ | | |
| | $d_6 = 0.2$ | |
| $r_7 = 80.0$ (Aspherical) | | |
| | $d_7 = 3.5$ | $n_4 = 1.491$ |
| $r_8 = -28.487$ | | |
| $k = 1.0, e = -0.353 \times 10^{-5}, f = -0.2 \times 10^{-6}$ | | |
| $g = 0, h = 0$ | | |
| $D = -1.0, E.P. = 10$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

22. An albada finder according to claim 6 wherein the surface of said eyepiece element on the eye side is the aspherical surface.

23. An albada finder according to claim 22 satisfying the following condition:

$$0.3 < k < 2.0.$$

24. An albada finder according to claim 23 having the following numerical data:

| | | |
|---|---|---|
| $r_1 = 109.951$ | | |
| | $d_1 = 1.0$ | $n_1 = 1.491$ |
| $r_2 = 12.899$ | | |
| | $d_2 = 2.6$ | |
| $r_3 = 500.0$ | | |
| | $d_3 = 1.0$ | $n_2 = 1.51633$ |
| $r_4 = 77.0$ | | |
| | $d_4 = 15.16$ | |
| $r_5 = -200.0$ | | |
| | $d_5 = 1.0$ | $n_3 = 1.491$ |
| $r_6 = \infty$ | | |
| | $d_6 = 0.5$ | |
| $r_7 = 100.0$ | | |
| | $d_7 = 4.0$ | $n_4 = 1.491$ |
| $r_8 = -27.205$ (Aspherical) | | |
| $k = 0.7, e = -0.344 \times 10^{-5}, f = 0, g = 0, h = 0$ | | |
| $D = -1.0, E.P. = 11$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

25. An albada finder according to claim 23 having the following numerical data:

| | | |
|---|---|---|
| $r_1 = \infty$ | | |
| | $d_1 = 1.0$ | $n_1 = 1.491$ |
| $r_2 = 15.6$ | | |
| | $d_2 = 2.6$ | |
| $r_3 = \infty$ | | |
| | $d_3 = 1.0$ | $n_2 = 1.51633$ |
| $r_4 = 78.542$ | | |
| | $d_4 = 14.74$ | |
| $r_5 = -150.0$ | | |
| | $d_5 = 1.0$ | $n_3 = 1.48749$ |
| $r_6 = \infty$ | | |
| | $d_6 = 0.2$ | |
| $r_7 = 50$ | | |
| | $d_7 = 3.54$ | $n_4 = 1.491$ |
| $r_8 = -34.123$ (Aspherical) | | |
| $k = 1.2, e = 0.154 \times 10^{-5}, f = 0, g = 0, h = 0$ | | |
| $D = -1.0, E.P. = 15$ | | | wherein the reference symbols $r_1$ through $r_8$ represent radii of curvature on the surfaces of the respective lens elements, the symbols $d_1$ through $d_7$ represent thicknesses of the respective lens elements and airspaces therebetween, the symbols $n_1$ through $n_4$ represent refractive indices of the respective lens elements, the symbol k represents conic coefficient, the symbols e, f, g and h respectively represent aspherical coefficients, the symbol D represents diopter and the symbol E.P. represents the distance between the surface of the eyepiece element on the eye side and the eye.

* * * * *